(12) United States Patent
Kuo (10) Patent No.: US 9,013,798 B2
(45) Date of Patent: Apr. 21, 2015

(54) PROJECTION LENS AND OPTICAL ENGINE

(71) Applicant: Tao-Hung Kuo, Hsin-Chu (TW)

(72) Inventor: Tao-Hung Kuo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 14/038,755

(22) Filed: Sep. 27, 2013

(65) Prior Publication Data

US 2014/0092483 A1 Apr. 3, 2014

(30) Foreign Application Priority Data

Sep. 28, 2012 (CN) .......................... 2012 1 0370135

(51) Int. Cl.
*G02B 13/18* (2006.01)
*G02B 13/16* (2006.01)

(52) U.S. Cl.
CPC ................ *G02B 13/18* (2013.01); *G02B 13/16* (2013.01)

(58) Field of Classification Search
CPC ........ G02B 13/18; G02B 13/16; G02B 13/04; G02B 7/008
USPC ................................... 359/649, 749, 752, 820
See application file for complete search history.

(56) References Cited

U.S. PATENT DOCUMENTS

| 3,656,839 | A | * | 4/1972 | Trotta | .......................... | 359/749 |
| 3,719,413 | A | * | 3/1973 | Lechner | ....................... | 359/749 |
| 5,914,818 | A | * | 6/1999 | Tejada et al. | ................... | 359/663 |
| 6,715,889 | B2 | | 4/2004 | Nishima et al. | | |
| 6,801,373 | B2 | * | 10/2004 | Reinecke et al. | ............. | 359/754 |
| 7,612,951 | B2 | | 11/2009 | Masui et al. | | |
| 2008/0013193 | A1 | * | 1/2008 | Bretthauer et al. | ........... | 359/754 |

\* cited by examiner

*Primary Examiner* — David N Spector
(74) *Attorney, Agent, or Firm* — Jianq Chyun IP Office (57) ABSTRACT

A projection lens disposed between an enlarged side and a reduced side is provided. The projection lens includes a first lens, a second lens, a third lens, a fourth lens, a fifth lens and a sixth lens, which are sequentially arranged from the enlarged side to the reduced side. Refractive powers of the first lens, the second lens, the third lens, the fourth lens, the fifth lens and the sixth lens are respectively negative, positive, positive, negative, positive and positive. A focal length of the third lens is greater than or equal to 20 mm and is less than or equal to 200 mm. An optical engine is also provided.

12 Claims, 7 Drawing Sheets

PROJECTION LENS AND OPTICAL ENGINE

CROSS-REFERENCE TO RELATED
APPLICATION

This application claims the priority benefit of China application serial no. 201210370135.8, filed on Sep. 28, 2012. The entirety of the above-mentioned patent application is hereby incorporated by reference herein and made a part of this specification.

BACKGROUND OF THE INVENTION

1. Field of the Invention

The invention generally relates to a lens and an optical device. More particularly, the invention relates to a projection lens and an optical engine.

2. Description of Related Art

Generally, in design of large-aperture projection lens, since an aperture thereof is relatively larger, the design usually requires a plurality of lenses to ensure a preferable optical imaging quality. A more preferable structure may only use six pieces of lenses to meet the design requirement. However, the structure must use aspherical lens to reduce aberration.

In addition, in the case where the aspherical lens is used for reducing aberration, if the aspherical lens close to the aperture stop is poorly designed, a sensitivity of the aspherical lens to imaging quality may be significantly increased, such that mass production of the projection lens can not be easily accomplished.

In addition, projector nowadays is designed to have light weight and compact size, so that internal temperature of projector may not be easily reduced. Once the aspherical lens is affected by a higher temperature, a thermal drift effect may occur accordingly, such that a gradually blurred projected image may been seen after the projector being turned on.

U.S. Pat. No. 6,715,889 discloses a projecting lens, a supporting member, a beam-splitting prism and a light modulation device. U.S. Pat. No. 7,612,951 discloses a thermal deformable barrel having a movable lens barrel and a bimetal member. Once temperature is raised, the bimetal member may be deformed by the thermal effect to move lens by moving the movable lens barrel, thereby causing a back focus position of the optical system to move.

SUMMARY OF THE INVENTION

The invention is directed to a projection lens having favorable optical imaging quality.

The invention is also directed to an optical engine which may effectively improve the thermal drift phenomenon.

Other advantages of the invention can be further illustrated by the technical features broadly embodied and described as follows.

In order to achieve one or a part of or all of the above advantages or other advantages, an embodiment of the invention provides a projection lens disposed between an enlarged side and a reduced side. The projection lens includes a first lens, a second lens, a third lens, a fourth lens, a fifth lens and a sixth lens. The first lens is disposed between the enlarged side and the reduced side and has a negative refractive power. The second lens is disposed between the first lens and the reduced side and has a positive refractive power. The third lens is disposed between the second lens and the reduced side and has a positive refractive power. The focal length of the third lens is greater than or equal to 20 millimeter (mm) and is less than or equal to 200 mm. The fourth lens is disposed between the third lens and the reduced side and has a negative refractive power. The fifth lens is disposed between the fourth lens and the reduced side and has a positive refractive power. The sixth lens is disposed between the fifth lens and the reduced side and has a positive refractive power.

According to an embodiment of the invention, an optical engine including a housing, an image source and a projection lens is provided. The housing has an opening and the image source is disposed within the housing. The projection lens is disposed on the opening and disposed between an enlarged side and a reduced side. The image source is disposed at the reduced side. The projection lens includes a first lens, a second lens, a third lens, a fourth lens, a fifth lens and a sixth lens. The first lens is disposed between the enlarged side and the reduced side and has a negative refractive power. The second lens is disposed between the first lens and the reduced side and has a positive refractive power. The third lens is disposed between the second lens and the reduced side and has a positive refractive power. The fourth lens is disposed between the third lens and the reduced side and has a negative refractive power. The fifth lens is disposed between the fourth lens and the reduced side and has a positive refractive power. The sixth lens is disposed between the fifth lens and the reduced side and has a positive refractive power. When the housing and the projection lens are heated, an optical parameter of the third lens varies with the third lens being heated, and compensates an optical effect generated from thermal expansion for the housing.

In the projection lens according to the embodiment of the invention, since a focal length of the third lens is greater than or equal to 20 mm and is less than or equal to 200 mm, and refractive powers of the first to sixth lenses are respectively negative, positive, positive, negative, positive and positive, thus the third lens has a relatively lower assembling sensitivity to imaging quality. Accordingly, an image having a clear imaging quality may be projected by the projection lens, and yield rate of the projection lens in mass production may also be increased. In addition, according to the optical engine in the embodiment of the invention, when the housing and the projection lens are heated, the optical parameter of the third lens varies with the third lens being heated, and compensates an optical effect generated from thermal expansion for the housing. Therefore, the thermal drift phenomenon of the optical engine may be effectively improved.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
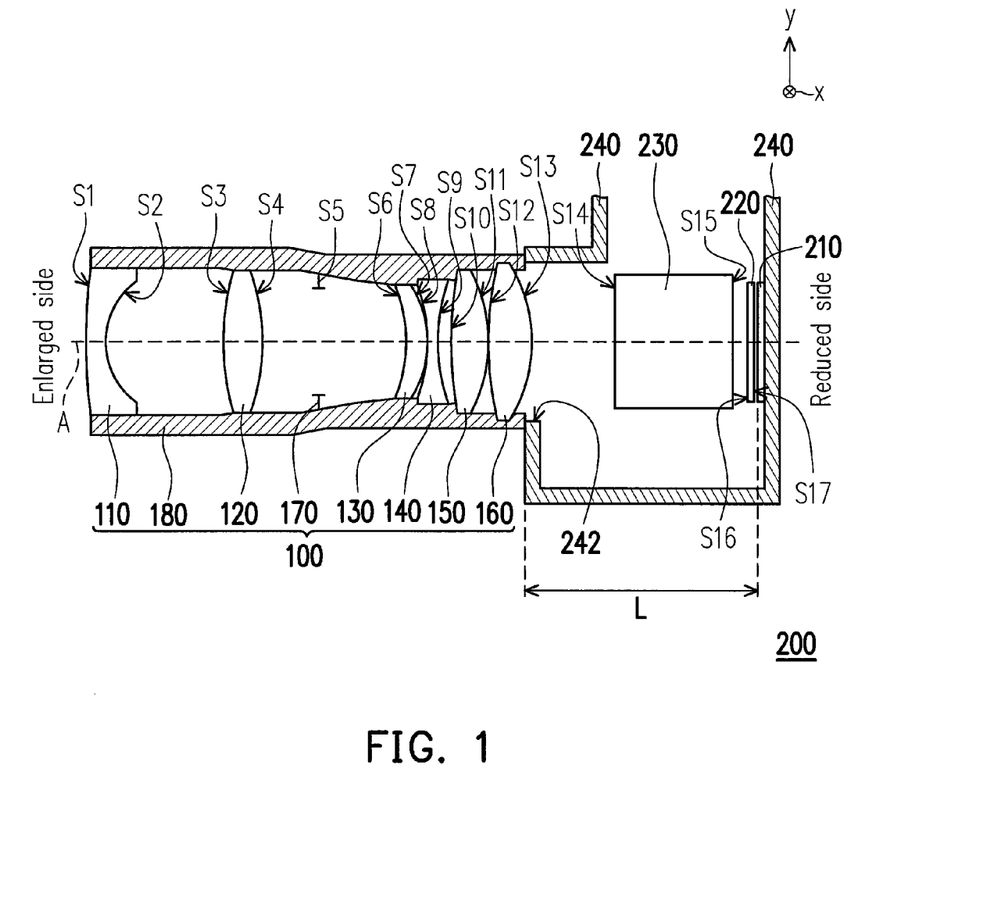
FIG. 1 is a schematic structural view of an optical engine according to an embodiment of the invention.

FIG. 1 is a schematic structural view of an optical engine according to an embodiment of the invention. Referring to FIG. 1, an optical engine 200 of the embodiment includes a housing 240, an image source 210 and a projection lens 100. The housing 240 has an opening 242 and the image source 210 is disposed within the housing 240. In this embodiment, the image source 210 is a light valve. The light valve, for example, is a digital micro-mirror device (DMD), a liquid-crystal-on-silicon panel (LCOS panel), or a transmissive liquid crystal panel. However, in other embodiments, the image source 210 may also be a self-illuminating display.

The projection lens 100 is disposed on the opening 242 and disposed between an enlarged side and a reduced side, in which the image source 210 is disposed at the reduced side. The projection lens 100 includes a first lens 110, a second lens 120, a third lens 130, a fourth lens 140, a fifth lens 150 and a sixth lens 160. The first lens 110 is disposed between the enlarged side and the reduced side and has a negative refractive power. The second lens 120 is disposed between the first lens 110 and the reduced side and has a positive refractive power. The third lens 130 is disposed between the second lens 120 and the reduced side and has a positive refractive power. The fourth lens 140 is disposed between the third lens 130 and the reduced side and has a negative refractive power. The fifth lens 150 is disposed between the fourth lens 140 and the reduced side and has a positive refractive power. The sixth lens 160 is disposed between the fifth lens 150 and the reduced side and has a positive refractive power.

In the embodiment, the projection lens 100 further includes an aperture stop 170 disposed between the second lens 120 and the third lens 130. In addition, the first lens 110 is, for example, a meniscus lens with a convex surface facing towards the enlarged side; the second lens 120 is, for example, a biconvex lens; the third lens 130 is, for example, a meniscus lens with a convex surface facing towards the reduced side; the fourth lens 140 is, for example, a biconcave lens; the fifth lens 150 is, for example, a biconvex lens; and the sixth lens 160 is, for example, a biconvex lens.

In the embodiment, the first lens 110 and the third lens 130 are, for example, aspherical lenses; and the second lens 120, the fourth lens 140, the fifth lens 150 and the sixth lens 160 are, for example, spherical lenses. In addition, in the embodiment, the first lens 110 and the third lens 130 may be, for example, plastic lenses; and the second lens 120, the fourth lens 140, the fifth lens 150 and the sixth lens 160 may be, for example, glass lenses.

In the projection lens 100 of the embodiment, since a focal length of the third lens 130 (i.e., the lens close to the aperture stop 170) is greater than or equal to 20 mm and is less than or equal to 200 mm; and refractive powers of the first lens 110 to the sixth lens 160 are respectively negative, positive, positive, negative, positive and positive, therefore the third lens 130 has a relatively lower assembling sensitivity to imaging quality. Accordingly, an image with a clear imaging quality may be projected by the projection lens 100, and yield rate of the projection lens 100 in mass production may also be increased.

An embodiment of the projection lens 100 is described below. It should be noted that, the invention is not limited to the data listed in Table 1 to Table 8. It should be known to those ordinary skilled in the art that various modifications and variations can be made to the structure of the invention after referring to the invention without departing from the scope or spirit of the invention.

TABLE 1

| Surface | Curvature radius (mm) | Distance (mm) | Refractive Index | Abbe Number | Notes |
|---|---|---|---|---|---|
| S1 | 181.26 | 2.0 | 1.492 | 57.44 | First Lens |
| S2 | 8.44 | 16.07 | | | |
| S3 | 47.72 | 5.04 | 1.743 | 49.34 | Second Lens |
| S4 | −29.95 | 7.93 | | | |
| S5 | Infinity | 11.43 | | | Aperture Stop |
| S6 | −32.81 | 2.91 | 1.525 | 55.95 | Third Lens |
| S7 | −15.09 | 0.1 | | | |
| S8 | −22.26 | 1.5 | 1.785 | 25.68 | Fourth Lens |
| S9 | 30.09 | 1.68 | | | |
| S10 | 65.92 | 5.04 | 1.516 | 64.14 | Fifth Lens |
| S11 | −19.87 | 0.1 | | | |
| S12 | 66.41 | 5.53 | 1.516 | 64.14 | Sixth Lens |
| S13 | −21 | 11.1629 | | | |
| S14 | Infinity | 16 | 1.589 | 61.27 | Seventh Lens |
| S15 | Infinity | 2 | | | |
| S16 | Infinity | 0.65 | 1.508 | 61.19 | Eighth Lens |
| S17 | Infinity | 0.303 | | | |

In Table 1, a distance is a straight line distance between two adjacent surfaces on an optical axis A of the projection lens 100. For example, the distance for a surface S1 is a straight line distance from the surface S1 to a surface S2 on the optical axis A. The thickness, refractive index, and abbe number corresponding to each of the lenses listed in the "Notes" column can be found in the corresponding values for the distance, refractive index, and abbe number from each row. In addition to Table 1, in which the surfaces S1 and S2 are two surfaces of the first lens 110, whereas surfaces S3 and S4 are two surfaces of the second lens 120, and a surface S5 refers to the aperture stop 170. Surfaces S6 and S7 are two surfaces of the third lens 130, whereas surfaces S8 and S9 are two surfaces of the fourth lens 140. Surfaces S10 and S11 are two surfaces of the fifth lens 150, whereas surfaces S12 and S13 are two surfaces of the sixth lens 160. Surfaces S14 and S15 are two surfaces of a total internal reflection prism (TIR prism), whereas surfaces S16 and S17 are two surfaces of a cover glass 220 being configured for protecting the image source 210. In Table 1, the distance listed in the row of a surface S17 is the distance from the surface S17 to the image source 210.

Values of the radius of curvature, the distance, and other parameters may refer to Table 1, which are not further described hereinafter.

The surfaces S1, S2, S6, and S7 are even-ordered polynomial aspherical surfaces that can be represented by the following equation:

$$Z = \frac{cr^2}{1+\sqrt{1-(1+k)c^2r^2}} + A_2 r^2 + A_4 r^4 + A_6 r^6 + A_8 r^8 + A_{10} r^{10} + A_{12} r^{12} + A_{14} r^{14} + \ldots$$

In the formula, Z is a sag along a direction of the optical axis A, and c is an inverse of the radius of an osculating sphere, that is, an inverse of the radius of curvature (e.g., radius of curvatures of surfaces S1 and S2 listed in the Table 1) close to the optical axis A. k is a conic coefficient, r is an aspherical height defined as a height from the center of the lens to the edge of the lens. $A_2, A_4, A_6, A_8, A_{10}, A_{12}, A_{14} \ldots$ are a plurality of aspherical coefficients, in which the coefficient $A_2$ is zero according to the present embodiment. Table 2 below lists the parameter values for surfaces S1, S2, S6, and S7.

TABLE 2

| Aspherical Surface Parameter | Conic coefficient k | Coefficient $A_4$ | Coefficient $A_6$ | Coefficient $A_8$ |
|---|---|---|---|---|
| S1 | 63.81 | −1.546E−5 | −2.994E−7 | 2.9933E−9 |
| S2 | −0.80 | 2.3875E−5 | −3.127E−7 | −1.230E−8 |
| S6 | 0 | −1.135E−4 | −4.487E−7 | −1.733E−8 |
| S7 | 0 | −7.337E−6 | −3.901E−7 | −1.135E−8 |

| Aspherical Surface Parameter | Coefficient $A_{10}$ | Coefficient $A_{12}$ | Coefficient $A_{14}$ |
|---|---|---|---|
| S1 | −6.724E−12 | −7.512E−14 | 3.9015E−16 |
| S2 | 3.6310E−10 | −4.149E−12 | 1.7259E−14 |
| S6 | −3.073E−12 | 3.7821E−12 | −6.854E−14 |
| S7 | 5.3063E−11 | 3.6908E−13 | −1.752E−14 |

Figure 2A:
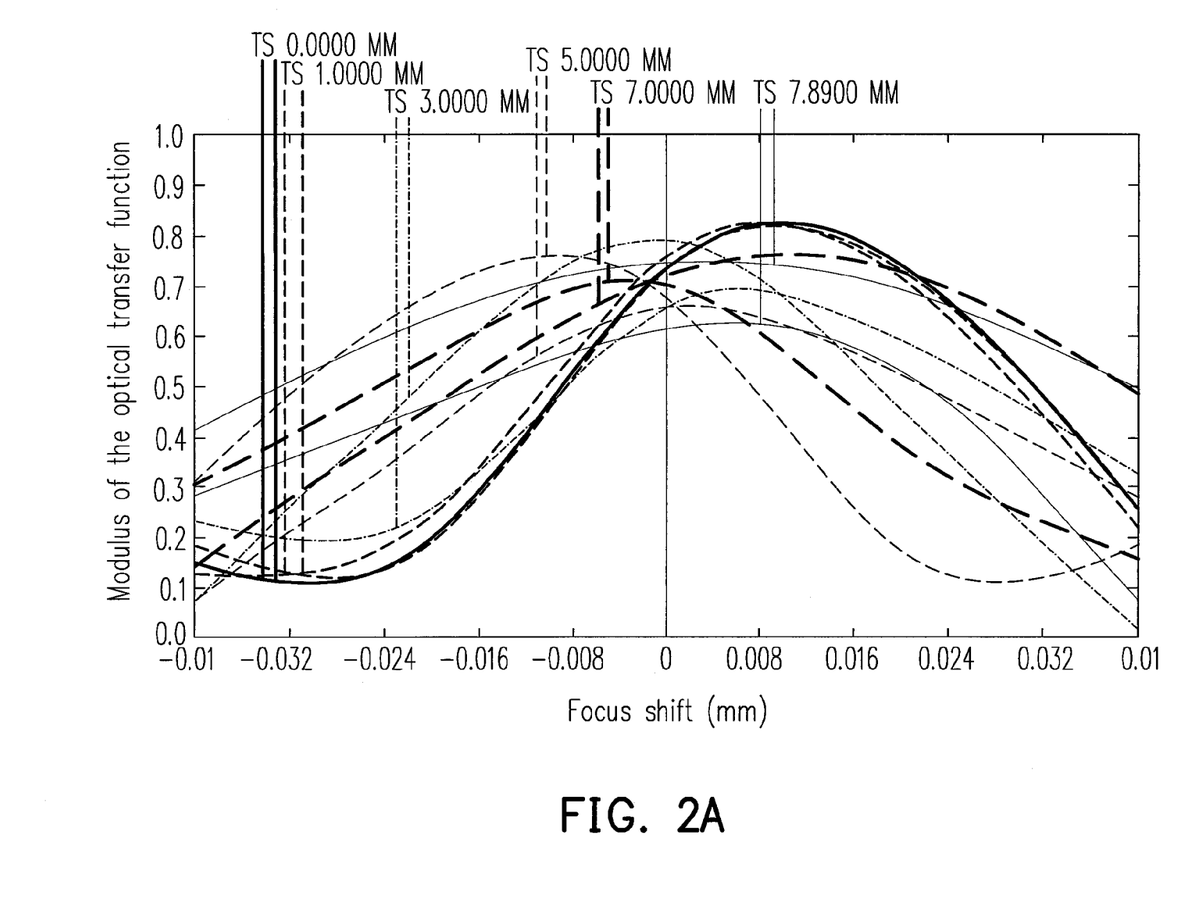
FIGS. 2A to 2C are imaging optics simulation data diagrams of a projection lens in FIG. 1.
Figure 2B:
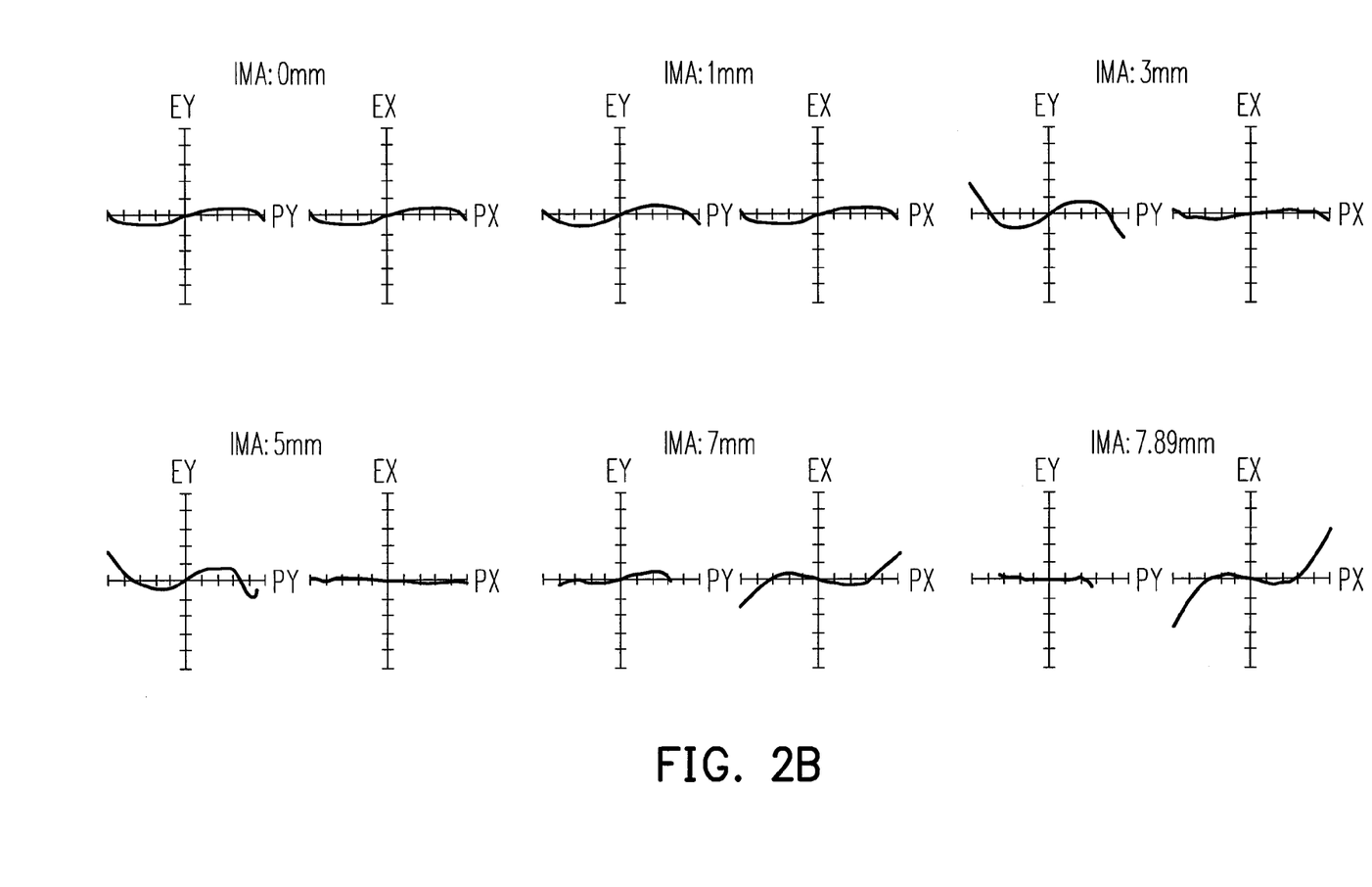
Figure 2C:
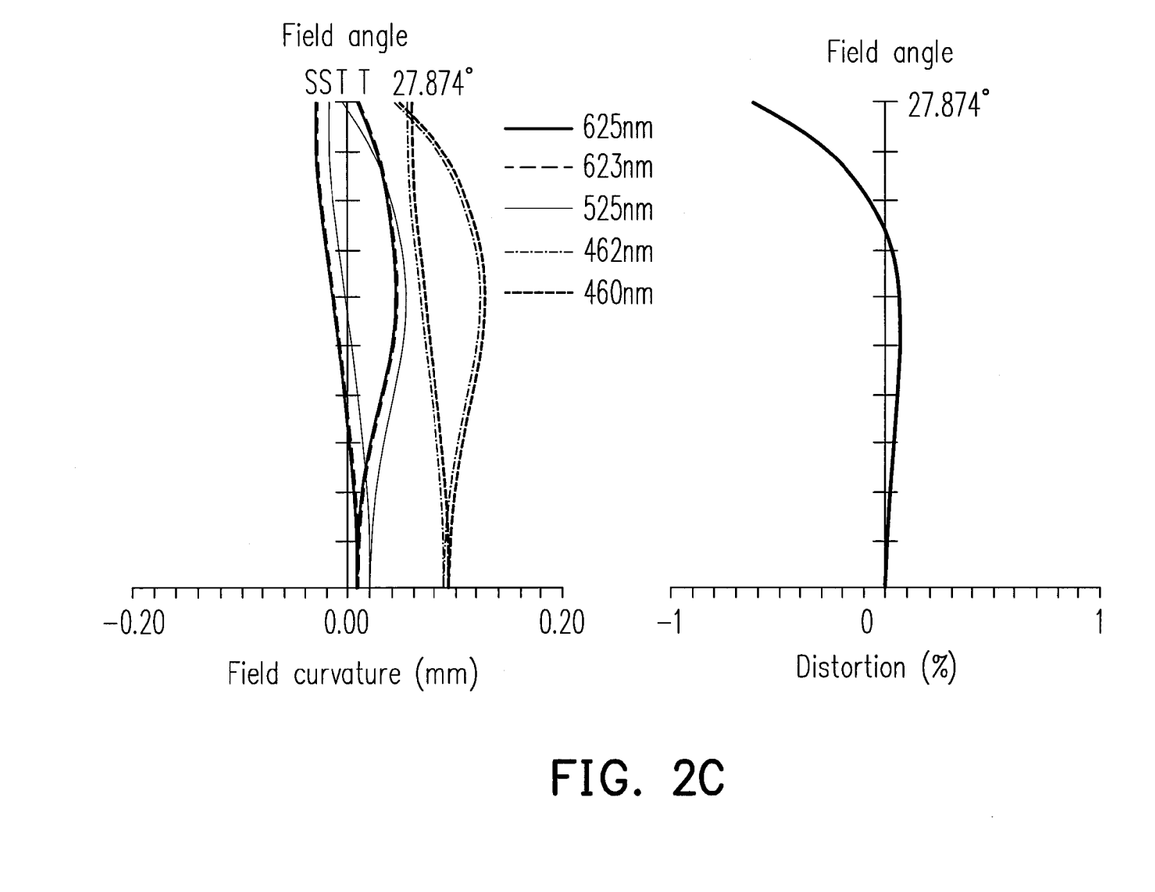

FIGS. 2A to 2C are imaging optics simulation data diagrams of a projection lens in FIG. 1. Referring to FIGS. 2A to 2C, FIG. 2A is a through focus modulation transfer function (through focus MTF) graph, in which the transverse axis is a focus shift (i.e., an out-of-focus position), and the longitudinal axis is a modulus of the optical transfer function. FIG. 2A is a simulation data diagram obtained with light having wavelength ranging from 460 nm to 625 nm. In addition, FIG. 2B is a transverse ray fan plot of an image, in which coordinates EY, PY, EX and PX have a maximum coordinate of 20 μm and a minimum coordinate of −20 μm. Moreover, FIG. 2C shows graphics of a field curvature and a distortion respectively from left to right, in which the graphic of the field curvature is simulated with lights having wavelengths of 625 nm, 623 nm, 525 nm, 462 nm and 460 nm, whereas the graphic of the distortion is simulated with lights having wavelengths of 625 nm, 623 nm, 525 nm, 462 nm and 460 nm. In FIGS. 2A and 2C, curves marked with T represent simulation data on tangential direction, whereas curves marked with S represent simulation data on sagittal direction. The graphics illustrated in FIGS. 2A to 2C all falls within the standard range, thereby validating that the projection lens 100 of the present embodiment may indeed have a favorable optical imaging quality.

Table 3 and Table 4 below are used to illustrate how the design of the projection lens 100 may reduce sensitivity to imaging quality for the third lens 130.

TABLE 3

| MTF Drop | Decentered by +0.02 mm in the x axis | Decentered by −0.02 mm in the x axis |
|---|---|---|
| Original Design | 26.79% | 26.79% |
| Present Embodiment | 1.70% | 1.70% |

TABLE 4

| MTF Drop | Decentered by +0.02 mm in the y axis | Decentered by −0.02 mm in the y axis |
|---|---|---|
| Original Design | 34.82% | 38.21% |
| Present embodiment | 3.40% | 3.40% |

In Table 3 and Table 4, the value "1.70%" in a field at intersection of the column "Decentered by +0.02 mm in the x axis" and the row "Present Embodiment" represents that, when the third lens 130 shifts by +0.02 mm towards the x direction corresponding to the optical axis A, modulation transfer function (MTF) of an image formed by the projection lens of the present embodiment is reduced by 1.70%. The physical meaning represented by the rest of the values in Tables 3 and 4 may be inferred with the same method. In addition, the x direction and the y direction are both perpendicular to the optical axis A; the x direction is perpendicular to the y direction; and the x direction may be, for example, a direction parallel to a horizontal direction of the image frame, whereas the y direction may be, for example, a direction parallel to a vertical direction of the image frame.

In view of Table 3 and Table 4, in comparing the projection lens 100 of the embodiment to original design, regardless of which direction the third lens 130 is decentered to, the decreasing degree of the modulation transfer function of the projection lens 100 is relatively lower. That is, the third lens 130 has a relatively lower sensitivity to an assembly deviation.

In the embodiment, the housing 240 may be, for example, made of magnalium. When receiving heat generated from the image source 210, the housing 240 is expanded by heat to increase the distance L (on the optical axis A) between the surface S13 and the image source 210. When the housing 240 and the projection lens 100 are heated, the optical parameter of the third lens 130 varies with the third lens 130 being heated, and compensates an optical effect generated from thermal expansion for the housing 240. In the embodiment, the optical parameter of the third lens 130 that varies with the third lens 130 being heated include at least one of a refractive index, a thickness, a surface radius of curvature and an aspherical coefficient. For instance, when the third lens 130 is expanded by heat, a refractive index of the third lens 130 may become smaller, which causes a back focal length of the projection lens 100 to extend, thereby compensating to an extended-by-heat effect of the distance L. In other words, despite that the distance L being expanded by heat, the back focal length of the projection lens 100 is also extended, which allows the projection lens 100 to focus on the image source 210 as well as possible, thereby increasing overall imaging quality of the projection lens 100.

Table 5 and Table 6 below are used to illustrate how the design of the projection lens 100 may allow the thermal drift phenomenon to be less obvious.

TABLE 5

| | Lenses | | | | | |
|---|---|---|---|---|---|---|
| | First Lens | Second Lens | Third Lens | Fourth Lens | Fifth Lens | Sixth Lens |
| Temperature (° C.) | 33 | 35 | 41 | 47.5 | 52 | 66 |

TABLE 6

| Thermal Drift | Thermal Drift for Back Focal Length of Projection Lens | Thermal Drift for Housing | Total Thermal Drift |
|---|---|---|---|
| Original Design | 0.025 mm | 0.033 mm | 0.058 mm |
| Present embodiment | −0.017 mm | 0.033 mm | 0.016 mm |

Table 5 is an example indicating temperature gradient endured by the first lens 110 to the sixth lens 160 in the projection lens 100. It is assumed that the optical engine 200 completes zooming in 30° C. after being turned on and a distance from the surface S13 to the image source 210 is 40 mm, in the case where a linear expansion coefficient of the housing 240 made of magnalium being $23 \times 10^{-6}$ (1/° C.), when the optical engine 200 endures the temperature gradient as shown in Table 5, (i.e., a temperature of the housing 240 raises to 66° C.), an expansion amount from the source S13 to the image source 210 is: $40 \times 23 \times 10^{-6} \times (66-30) = 0.033$ mm. This is because the projection lens 100 is installed on the opening 242 of the housing 240, while the image source 210 is installed on an inner surface of the housing 240. Therefore, when the housing 240 is expanded by heat, the distance from the source S13 to the image source 210 may be increased accordingly.

At this time, the third lens 130 may be raised to 41 degrees. As a result, the refractive index of the third lens 130 may be decreased accordingly, which extended a back focal length of the projection lens 100 by 0.017 mm, i.e., a thermal drift effect of −0.017 mm is generated (as shown in Table 6). Accordingly, overall thermal drift of the optical engine 200 may be reduced to 0.016 mm. Since the third lens 130 has a positive refractive power, an image generated by the back focal length of the projection lens 100 may be extended when the third lens 130 is expanded by heat. In addition, since the third lens 130 is a plastic lens, and variation of a refractive index of the plastic lens is greater in comparing to that of a glass lens, thus the third lens 130 is adapted for compensating thermal drift effect caused by the housing 240.

In addition, since the third lens 130 of the embodiment with special design is not included in that of original design, thermal drift of the lens returns with a positive value (i.e., 0.025 mm), and hence overall thermal drift of the optical engine is 0.058 mm. In comparison, the thermal drift of the optical engine 20 of the embodiment is relatively smaller.

The optical parameters of the projection lens 100 listed in Table 1 and Table 2 above are optical parameters when the optical engine 200 just being turned on. The optical parameters of the projection lens 100 listed in Table 7 and Table 8 below are optical parameters of the projection lens 100 after the optical engine 200 being turned on for a period of time in the environment having temperature gradient as shown in Table 5.

TABLE 7

| Surface | Curvature radius (mm) | Distance (mm) | Refractive Index | Abbe Number | Notes |
|---|---|---|---|---|---|
| S1 | 181.291 | 2.0004 | 1.4904 | 57.44 | First Lens |
| S2 | 8.439 | 16.066 | | | |
| S3 | 47.726 | 5.044 | 1.7433 | 49.34 | Second Lens |
| S4 | −29.957 | 7.935 | | | |
| S5 | Infinity | 11.428 | | | Aperture Stop |
| S6 | −32.833 | 2.907 | 1.5235 | 55.95 | Third Lens |
| S7 | −15.101 | 0.103 | | | |
| S8 | −22.268 | 1.5004 | 1.7848 | 25.68 | Fourth Lens |
| S9 | 30.089 | 1.676 | | | |
| S10 | 65.934 | 5.044 | 1.51640 | 64.14 | Fifth Lens |
| S11 | −19.873 | 0.1009 | | | |
| S12 | 66.435 | 5.533 | 1.51644 | 64.14 | Sixth Lens |
| S13 | −21.006 | 11.1959 | | | |
| S14 | Infinity | 16.004 | 1.5893 | 61.27 | Seventh Lens |
| S15 | Infinity | 2.0004 | | | |
| S16 | Infinity | 0.6501 | 1.5088 | 61.19 | Eighth Lens |
| S17 | Infinity | 0.303 | | | |

TABLE 8

| Aspherical Surface Parameter | Conic coefficient k | Coefficient $A_4$ | Coefficient $A_6$ | Coefficient $A_8$ |
|---|---|---|---|---|
| S1 | 63.81 | −1.545E−5 | −2.991E−7 | 2.9895E−9 |
| S2 | −0.80 | 2.3862E−5 | −3.124E−7 | −1.229E−8 |
| S6 | 0 | −1.133E−4 | −4.473E−7 | −1.725E−8 |
| S7 | 0 | −7.323E−6 | −3.888E−7 | −1.130E−8 |

| Aspherical Surface Parameter | Coefficient $A_{10}$ | Coefficient $A_{12}$ | Coefficient $A_{14}$ |
|---|---|---|---|
| S1 | −6.713E−12 | −7.497E−14 | 3.8924E−16 |
| S2 | 3.6251E−10 | −4.141E−12 | 1.7218E−14 |
| S6 | −3.055E−12 | 3.7547E−12 | −6.795E−14 |
| S7 | 5.2749E−11 | 3.6641E−13 | −1.737E−14 |

The physical meaning in each of the values listed in Table 7 and Table 8 may refer to the physical meaning in each of the values in Table 1 and Table 2. Comparing Table 7 and Table 8 with Table 1 and Table 2, influences to the projection lens 100 caused by temperature gradient can be seen therein.

Figure 3A:
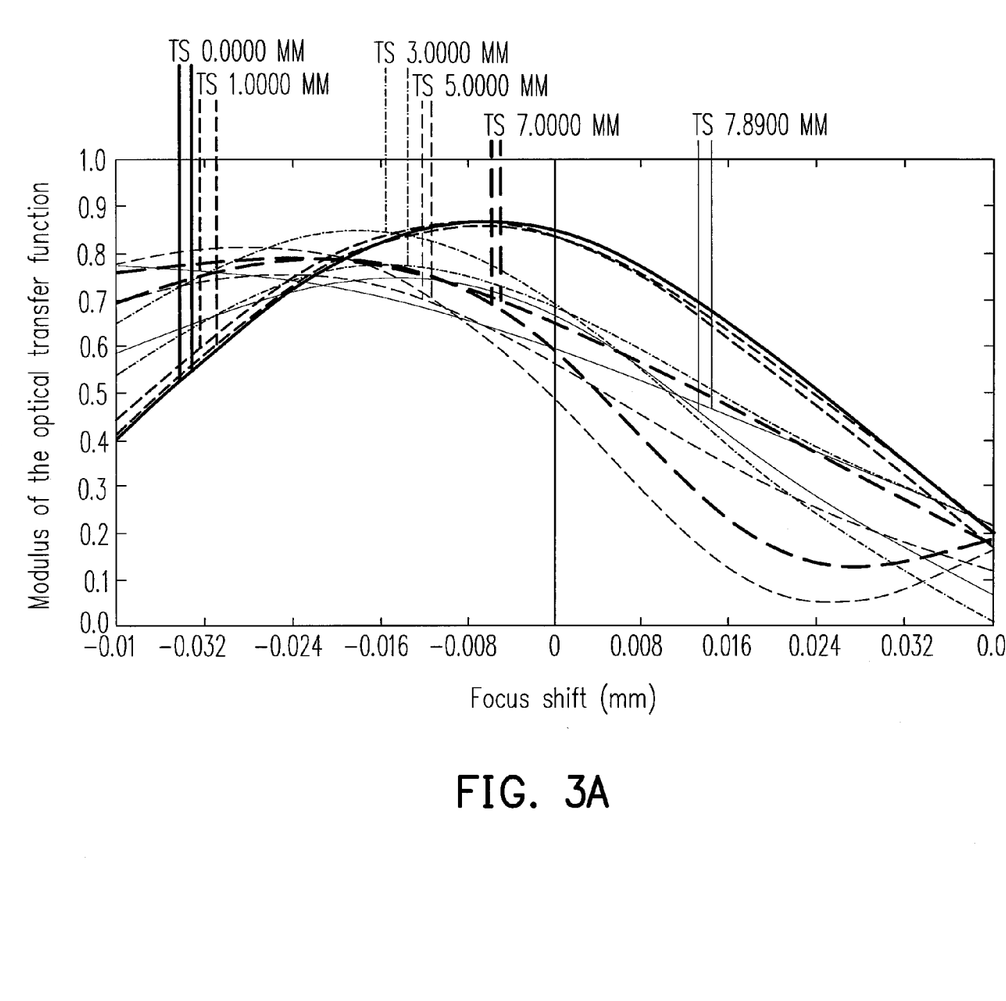
FIGS. 3A to 3C are imaging optics simulation data diagrams of the projection lens in FIG. 1 under the temperature gradient as listed in Table 5.
Figure 3B:
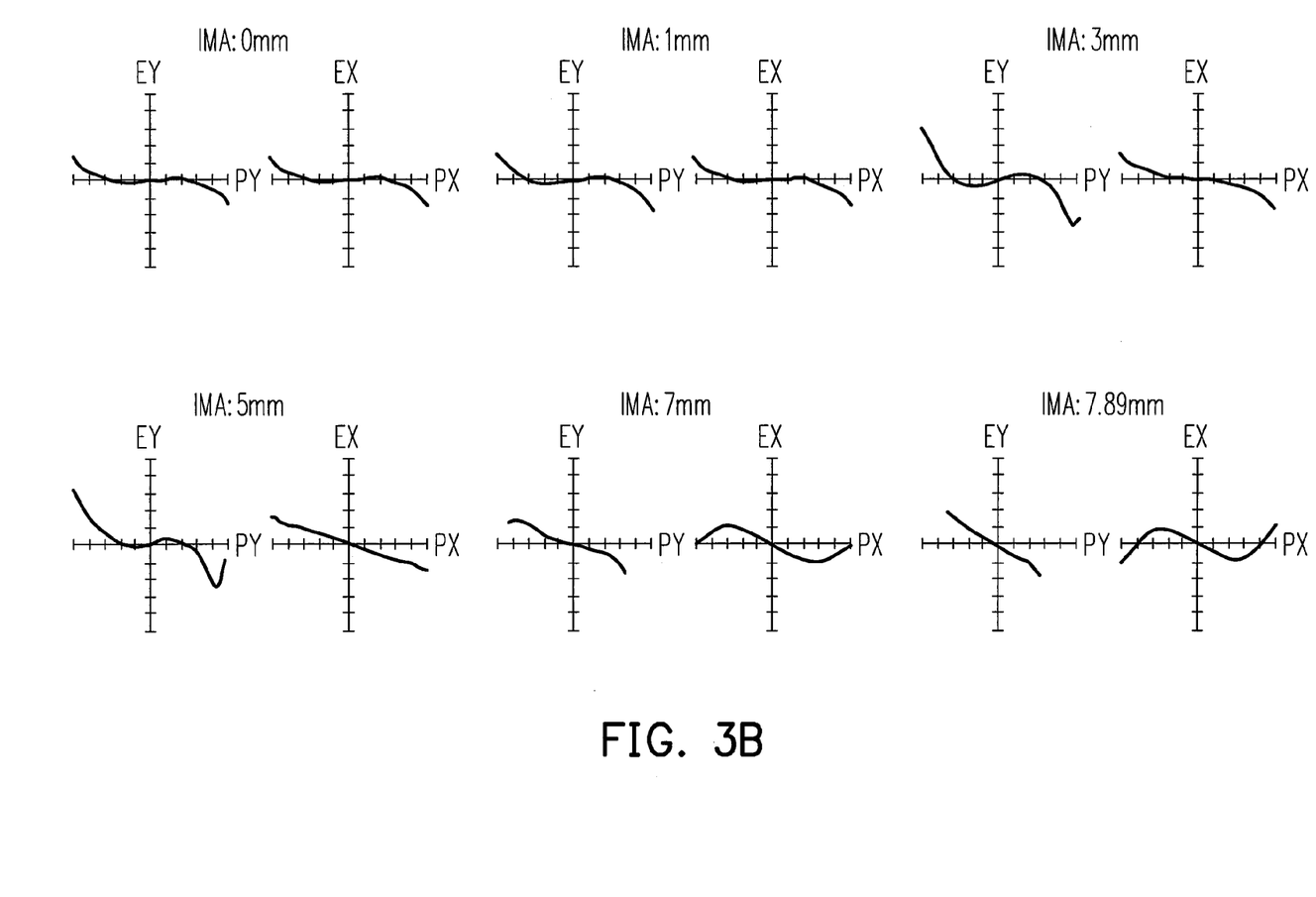
Figure 3C:
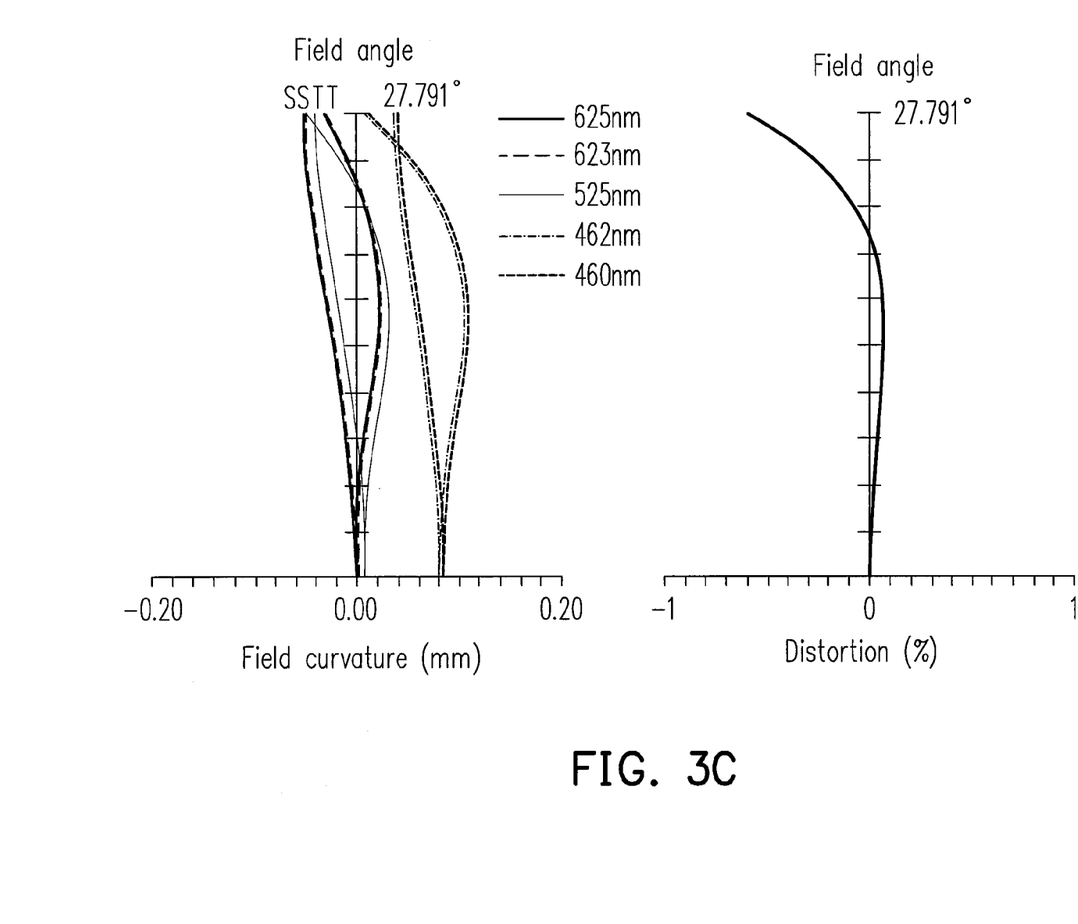

FIGS. 3A to 3C are imaging optics simulation data diagrams of the projection lens in FIG. 1 under the temperature gradient as listed in Table 5. FIGS. 2A to 2C are imaging optics simulation data diagrams of the projection lens in FIG. 1 when just being turned on. Referring to FIGS. 3A to 3C, FIG. 3A is a through focus modulation transfer function graph, in which the transverse axis is a focus shift (i.e., an out-of-focus position), and the longitudinal axis is a modulus of the optical transfer function. FIG. 3A is a simulation data diagram obtained with light having wavelength ranging from 460 nm to 625 nm. In addition, FIG. 3B is a transverse ray fan plot of an image, in which coordinates EY, PY, EX and PX have a maximum coordinate of 20 μm and a minimum coordinate of −20 μm. Moreover, FIG. 3C shows graphics of a field curvature and a distortion respectively from left to right, in which the graphic of the field curvature is simulated with lights having wavelengths of 625 nm, 623 nm, 525 nm, 462 nm and 460 nm, whereas the graphic of the distortion is simulated with lights having wavelengths of 625 nm, 623 nm, 525 nm, 462 nm and 460 nm. In FIGS. 3A and 3C, curves marked with T represent simulation data on tangential direction, whereas curves marked with S represent simulation data on sagittal direction. The graphics illustrated in FIGS. 3A to 3C all falls within the standard range, thereby validating that the projection lens 100 of the present embodiment is capable of effectively improving the thermal drift phenomenon. That is, the imaging quality suffers less effect when environmental temperature is raised.

In view of above, in the projection lens according to the embodiments of the invention, since a focal length of the third lens is greater than or equal to 20 mm and is less than or equal to 200 mm; and refractive powers of the first to sixth lenses are sequentially negative, positive, positive, negative, positive and positive, thus the third lens has a relatively lower assembling sensitivity to imaging quality. Accordingly, an image having a clear imaging quality may be projected by the projection lens, and yield rate of the projection lens in mass production may also be increased. In addition, according to the optical engine in the embodiments of the invention, when the housing and the projection lens are heated, optical parameters of the third lens varies with the third lens being heated, and compensates an optical effect generated from thermal expansion for the housing. Therefore, the thermal drift phenomenon of the optical engine may be effectively improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

Moreover, the terms such as "first lens", "second lens" as recited in the specification are intended to give the elements names, and the maximum number or the minimum number of the elements is not limited thereto.

What is claimed is:

1. A projection lens disposed between an enlarged side and a reduced side, the projection lens comprising:
   a first lens disposed between the enlarged side and the reduced side, the first lens having a negative refractive power;
   a second lens disposed between the first lens and the reduced side, the second lens having a positive refractive power;
   a third lens disposed between the second lens and the reduced side, the third lens having a positive refractive power, wherein a focal length of the third lens is greater than or equal to 20 mm and is less than or equal to 200 mm;
   a fourth lens disposed between the third lens and the reduced side, the fourth lens having a negative refractive power;
   a fifth lens disposed between the fourth lens and the reduced side, the fifth lens having a positive refractive power; and
   a sixth lens disposed between the fifth lens and the reduced side, the sixth lens having a positive refractive power,
   wherein the first lens and the third lens are aspherical lenses.

2. The projection lens of claim 1, wherein the second lens, the fourth lens, the fifth lens and the sixth lens are spherical lenses.

3. The projection lens of claim 1, wherein the first lens is a meniscus lens with a convex surface facing towards the enlarged side; the second lens is a biconvex lens; the third lens is a meniscus lens with a convex surface facing towards the reduced side; the fourth lens is a biconcave lens; the fifth lens is a biconvex lens; and the sixth lens is a biconvex lens.

4. The projection lens of claim 1, wherein the first lens and the third lens are plastic lenses; and the second lens, the fourth lens, the fifth lens and the sixth lens are glass lenses.

5. The projection lens of claim 1, wherein the projection lens further comprises an aperture stop disposed between the second lens and the third lens.

6. An optical engine, comprising:
   a housing having an opening;
   an image source disposed within the housing; and
   a projection lens disposed on the opening and disposed between an enlarged side and a reduced side, the image source being disposed at the reduced side, the projection lens comprising:
   a first lens disposed between the enlarged side and the reduced side, the first lens having a negative refractive power;
   a second lens disposed between the first lens and the reduced side, the second lens having a positive refractive power;
   a third lens disposed between the second lens and the reduced side, the third lens having a positive refractive power;
   a fourth lens disposed between the third lens and the reduced side, the fourth lens having a negative refractive power;
   a fifth lens disposed between the fourth lens and the reduced side, the fifth lens having a positive refractive power; and
   a sixth lens disposed between the fifth lens and the reduced side, the sixth lens having a positive refractive power,
   wherein the first lens and the third lens are aspherical lenses; and
   wherein when the housing and the projection lens are heated, an optical parameter of the third lens varies with the third lens being heated, and compensates an optical effect generated from thermal expansion for the housing.

7. The optical engine of claim 6, wherein the second lens, the fourth lens, the fifth lens and the sixth lens are spherical lenses.

8. The optical engine of claim 6, wherein the first lens is a meniscus lens with a convex surface facing towards the enlarged side; the second lens is a biconvex lens; the third lens is a meniscus lens with a convex surface facing towards the reduced side; the fourth lens is a biconcave lens; the fifth lens is a biconvex lens; and the sixth lens is a biconvex lens.

9. The optical engine of claim 6, wherein the first lens and the third lens are plastic lenses; and the second lens, the fourth lens, the fifth lens and the sixth lens are glass lenses.

10. The optical engine of claim 6, wherein the optical parameter of the third lens comprise at least one of a refractive index, a thickness, a surface radius of curvature and an aspherical coefficient.

11. The optical engine of claim 6, wherein a focal length of the third lens is greater than or equal to 20 mm and is less than or equal to 200 mm.

12. The optical engine of claim 6, wherein the projection lens further comprises an aperture stop disposed between the second lens and the third lens.

* * * * *